US012174727B1

(12) United States Patent
Hanebutte et al.

(10) Patent No.: US 12,174,727 B1
(45) Date of Patent: Dec. 24, 2024

(54) METHOD AND APPARATUS FOR CORRELATING HIGH-LEVEL CODE WITH LOW-LEVEL INSTRUCTIONS FOR MACHINE LEARNING APPLICATIONS

(71) Applicant: Marvell Asia Pte, Ltd., Singapore (SG)

(72) Inventors: Ulf Hanebutte, Gig Harbor, WA (US); Harri Hakkarainen, Los Gatos, CA (US); Senad Durakovic, Palo Alto, CA (US); Chien-Chun Chou, Morgan Hill, CA (US)

(73) Assignee: Marvell Asia Pte Ltd, Singapore (SG)

( * ) Notice: Subject to any disclaimer, the term of this patent is extended or adjusted under 35 U.S.C. 154(b) by 78 days.

(21) Appl. No.: 17/390,019

(22) Filed: Jul. 30, 2021

Related U.S. Application Data

(60) Provisional application No. 63/214,632, filed on Jun. 24, 2021.

(51) Int. Cl.
*G06F 11/36* (2006.01)
*G06F 8/41* (2018.01)
*G06F 11/34* (2006.01)
*G06N 20/00* (2019.01)

(52) U.S. Cl.
CPC ............ *G06F 11/3664* (2013.01); *G06F 8/41* (2013.01); *G06F 11/3466* (2013.01); *G06N 20/00* (2019.01)

(58) Field of Classification Search
None
See application file for complete search history.

(56) References Cited

U.S. PATENT DOCUMENTS

| 7,673,297 | B1 * | 3/2010 | Arsenault | H04N 21/42692 |
| | | | | 717/172 |
| 11,232,016 | B1 * | 1/2022 | Huynh | G06N 3/0454 |
| 2012/0159444 | A1 * | 6/2012 | Agarwal | G06F 11/3624 |
| | | | | 717/124 |
| 2017/0083431 | A1 * | 3/2017 | Burger | G06F 9/30145 |

* cited by examiner

*Primary Examiner* — Lewis A Bullock, Jr.
*Assistant Examiner* — Mark A Gooray

(57) ABSTRACT

A new approach is proposed to support correlating high-level code with low-level instructions of an application running on a hardware. A compiler that compiles a high-level function in the high-level code of the application into a set of low-level instructions to be executed on the hardware is configured to utilize one or more reserved fields of the set of low-level instructions to incorporate one or more IDs and an actionable item. The IDs are mapped to the high-level function, wherein such mapping is programmable by the compiler. Based on the mapped IDs and the actionable item incorporated in the set of the low-level instructions, the runtime performance of the application on the hardware can be monitored and profiled and issues related to the high-level code of the application can be identified for debugging purposes.

29 Claims, 7 Drawing Sheets

| 202 | | | | ID | Line no. | | |
|---|---|---|---|---|---|---|---|
| 204 | | | | | | | |
| | ⋮ | | | ⋯ | | | |
| 210 | | | | | | | |

FIG. 2

| 502 | 504 | 506 | 508 | 510 | 512 | 514 | 516 | 518 | 520 | 522 |
|---|---|---|---|---|---|---|---|---|---|---|
| tile_ID | task_ID | agent | cycle_act | cycle_end | debugID | line number | PE start | PE time | POD start | POD time |
| 0 | 544 | PE | 287999 | 290776 | MLLIB_FLATTENINGTRANSPOSE_XSTEPS | 2411 | 0 | 2777 | | |
| 0 | 545 | POD | 290777 | 294948 | MLLIB_INT8MATRIXMULTIPLYLAMM | 2415 | | | 2778 | 4171 |
| 0 | 546 | PE | 290777 | 294163 | MLLIB_FLATTENINGTRANSPOSE_XSTEPS | 2411 | 2778 | 3386 | | |
| 0 | 547 | POD | 294949 | 299120 | MLLIB_INT8MATRIXMULTIPLYLAMM | 2415 | | | 6950 | 4171 |
| 0 | 548 | PE | 294949 | 298335 | MLLIB_FLATTENINGTRANSPOSE_XSTEPS | 2411 | 6950 | 3386 | | |
| 0 | 549 | POD | 299121 | 303292 | MLLIB_INT8MATRIXMULTIPLYLAMM | 2415 | | | 11122 | 4171 |
| 0 | 550 | PE | 299121 | 302767 | MLLIB_FLATTENINGTRANSPOSE_XSTEPS | 2411 | 11122 | 3646 | | |
| 0 | 551 | POD | 303293 | 307464 | MLLIB_INT8MATRIXMULTIPLYLAMM | 2415 | | | 15294 | 4171 |
| 0 | 552 | PE | 303293 | 306952 | MLLIB_FLATTENINGTRANSPOSE_XSTEPS | 2411 | 15294 | 3659 | | |
| 0 | 553 | POD | 307465 | 311636 | MLLIB_INT8MATRIXMULTIPLYLAMM | 2415 | | | 19466 | 4171 |
| 0 | 554 | PE | 307465 | 310851 | MLLIB_FLATTENINGTRANSPOSE_XSTEPS | 2411 | 19466 | 3386 | | |
| 0 | 555 | POD | 311637 | 315808 | MLLIB_INT8MATRIXMULTIPLYLAMM | 2415 | | | 23638 | 4171 |
| 0 | 556 | PE | 311637 | 315023 | MLLIB_FLATTENINGTRANSPOSE_XSTEPS | 2411 | 23638 | 3386 | | |
| 0 | 557 | POD | 315809 | 319980 | MLLIB_INT8MATRIXMULTIPLYLAMM | 2415 | | | 27810 | 4171 |

FIG. 5A

METHOD AND APPARATUS FOR CORRELATING HIGH-LEVEL CODE WITH LOW-LEVEL INSTRUCTIONS FOR MACHINE LEARNING APPLICATIONS

CROSS-REFERENCE TO RELATED APPLICATIONS

The application claims the benefit of U.S. Provisional Patent Application No. 63/214,632, filed Jun. 24, 2021, which is incorporated herein in its entirety by reference.

BACKGROUND

Performance analysis and correctness debugging of any application benefit greatly from the ability to correlate low-level executable instructions to their corresponding high-level code (e.g., library function calls), which is compiled by a compiler to generate the low-level instructions. Such correlation between the high-level code and the low-level instructions is of particular importance for machine learning (ML) applications targeting dedicated ML hardware, which may not provide low-level profiling and debugging support that can be found in general purpose computing hardware running a full operating system.

In order to establish the correlations between the high-level code and the low-level instructions of an application, some approaches may break up the compiler-generated low-level instructions into a plurality of small sections that can be correlated to the high-level code and then run each of the small sections of low-level instructions individually on the hardware. Alternatively, if hardware and/or software support is provided, the low-level instructions can be instrumented/augmented by the compiler with calls to one or more profiling or debug library functions, which are additional low-level instructions to access hardware resources such as timers, counters and registers. Changing the low-level instructions or how the low-level instructions are dispatched or executed, however, can be cumbersome and costly, and may disturb the very object (e.g., the low-level instructions) being observed/monitored for performance or debugging purposes.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 2 depicts an example of a template of the set of low-level instructions compiled from a high-level code for an operation according to one aspect of the present embodiments.

FIGS. 5A-5B depict an example of performance statistics of two high-level functions measured in terms of clock cycles in table and bar chart formats, respectively, according to one aspect of the present embodiments.

DETAILED DESCRIPTION

Figure 1:
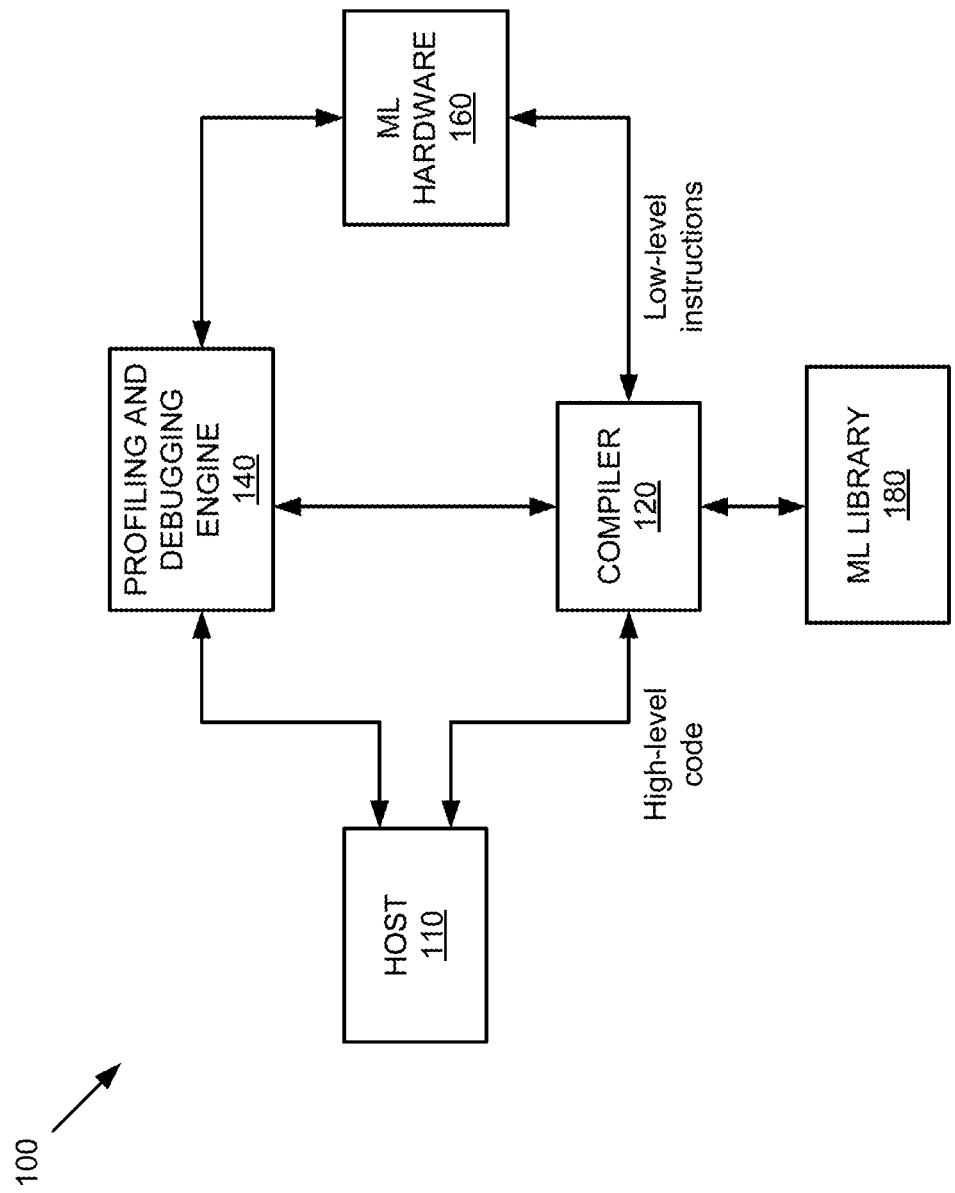
FIG. 1 depicts an example of a diagram of a system to support correlating high-level code with low-level instructions of an application running on ML hardware according to one aspect of the present embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein. It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

A new approach is proposed that contemplates systems and methods to support correlating high-level code with low-level instructions of an application running on an ML hardware. Under the proposed approach, a compiler that compiles a high-level function in the high-level code of the application into a set of low-level instructions to be executed on the ML hardware is configured to utilize one or more reserved fields of the set of low-level instructions to incorporate one or more identifications or IDs and an actionable item. These IDs and actionable item can be set during compile time of the low-level instructions and are accessible by the ML hardware or a software-emulation of the hardware during runtime. The one or more IDs are mapped to the high-level function representing an ML operator or a specific library function that is being called by the compiler, wherein such mapping is programmable by the compiler. Based on the mapped IDs and the actionable item incorporated in the set of the low-level instructions, the runtime performance of the application on the ML hardware can be monitored and profiled and issues, problems, errors or bugs related to the high-level code of the application can be identified for debugging purposes.

By utilizing the reserved fields in a set of low-level instructions at compile time, the proposed approach allows performance profiling and debugging of the high-level code without introducing any new low-level instructions for the sole purpose of performance profiling and application debugging. Since the overall number of low-level instructions to be executed on the ML hardware remains unchanged and no additional instructions are introduced, the instruction flow and the executables of the application are not adversely affected or disturbed for performance profiling purposes. As a result, accurate performance profiling and debugging of the application can be achieved.

Although an instruction set architecture (ISA) is used as a non-limiting example of the low-level instruction format to illustrate the proposed approach in the embodiments described below, it is appreciated that the same or similar approach is equally applicable to other types of low-level instructions having one or more reserved fields to support correlating the high-level code with the low-level instructions of an application.

Although an ML hardware (e.g., inference engine) is used as a non-limiting example of the hardware where the low-level instructions are executed to illustrate the proposed approach in the embodiments described below, it is appreciated that the same or similar approach is equally applicable to other types of hardware or hardware simulator to support correlating the high-level code with the low-level instructions of an application.

Although an ML-related operation or function is used as a non-limiting example of the high-level code being profiled or debugged to illustrate the proposed approach in the embodiments described below, it is appreciated that the same or similar approach is equally applicable to other types of software applications including but not limited to firmware, hardware simulation software, or register transfer level (RTL) simulation software, to support correlating the high-level code with the low-level instructions of an application.

FIG. 1 depicts an example of a diagram of a system 100 to support correlating high-level code with low-level instructions of an application running on ML hardware. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes at least a compiler (compiling engine) 120 and a profiling and debugging engine 140. Each of the components in the system 100 runs on one or more computing units or devices (not shown) each with software instructions stored in a storage unit such as a non-volatile memory of the computing unit for practicing one or more processes. When the software instructions are executed, at least a subset of the software instructions is loaded into memory by one of the computing units, which becomes a special purposed one for practicing the processes. The processes may also be at least partially embodied in the computing units into which computer program code is loaded and/or executed, such that, the computing units become special purpose computing units for practicing the processes.

Figure 2:
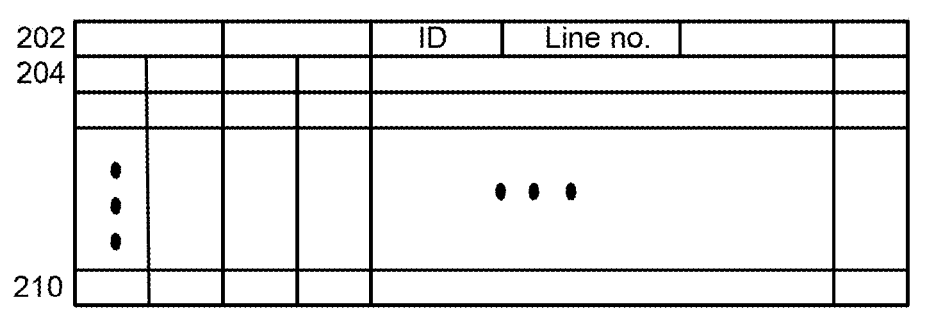

In the example of FIG. 1, the compiler 120 coupled to a host 110 is configured to accept a high-level code of an application (e.g., an ML operation) from the host 110, wherein the high-level code includes a plurality of high-level functions/operators each called at one or more lines in the high-level code. The compiler 120 is then configured to compile each high-level function/operator in the high-level code into a set of low-level instructions to be executed on the ML hardware 160, wherein each set of the low-level instructions is uniquely identified and associated with the high-level function/operator. In some embodiments, the same high-level function/operator may be compiled to different set of low-level instructions depending on the context of the high-level code from which the high-level function/operator is being called. FIG. 2 depicts an example of a template of the set of low-level instructions compiled from a high-level function for the ML operation, wherein 202 is a header with one or more reserved fields describing the set of low-level instructions 204-210. Here, the high-level code is a software code written through a commonly-used high-level programming language. For a non-limiting example, the high-level functions of the application or ML operation can be a dense and/or regular operation, e.g., a matrix operation such as multiplication, matrix manipulation, tanh, sigmoid, etc. For another non-limiting example, the high-level functions of the application or ML operation can be a sparse or irregular operation, e.g., memory transpose, addition operation, operations on irregular data structures (such as trees, graphs, and priority queues), etc. In some embodiments, the high-level code of the application may include one or more library function calls to an ML library 180. For a non-limiting example, the compiler 120 may call a library function to perform a matrix-matrix-multiplication of two matrices of given sizes and the ML library 180 returns the set of low-level instructions that are needed to perform this library function, wherein the set of low-level instructions includes one or more of loading data from a memory (e.g., OCM) into registers, executing dot-product, and storing the data back into the memory. For another non-limiting example, a library function call may be a load command having various parameters, wherein the compiler 120 may pass certain parameters to the ML hardware 160 via the library function call. By passing the parameters and/or the data from the compiler 120 to the ML hardware 160, the function call provides a mechanism to seamlessly use a single type/format of low level instructions such as the ISA discussed below by encapsulating the low level instructions within the function call and providing the low level instructions as data to the ML hardware 160 where the low level instructions are executed.

In some embodiments, the set of low-level instructions are in the format of an instruction set architecture (ISA) designed for efficient data processing covering, for non-limiting examples, one or more of different addressing modes, native data types, registers, memory architectures, and interrupts. In some embodiments, the ISA is a predominantly asynchronous instruction set, wherein each instruction in the ISA format programs a state-machine, which then runs asynchronously with respect to other state machines. It is appreciated that a series of instructions in the ISA format do not necessarily imply sequential execution. In some embodiments, the ISA provides separate synchronizing instructions to ensure order between instructions where needed. In some embodiments, when being executed on the ML hardware 160, the set of low-level instructions in the ISA format program the ML hardware 160 by one or more of: (i) programming one or more input data streams to the ML hardware 160; (ii) programming one or more operations to be performed on the input data streams; and (iii) programming one or more output data streams from the ML hardware 160.

In some embodiments, after a set of the low-level instructions is compiled from each high-level function/operator, the compiler 120 is configured to utilize one or more reserved fields in the header 202 associated with the set of the low-level instructions 204-210 to incorporate one or more identifications or IDs (e.g., debug IDs) and an actionable item that are related to the high-level function. In some embodiments, the compiler 120 is configured to program/map/assign each of the one or more IDs to the high-level function, wherein each mapped ID denotes a specific high-level operator or a specific library function that is being called by the compiler 120. In some embodiments, the mapping between the one or more IDs and the high-level operators can be dynamically adjusted by the compiler 120 at runtime for profiling and debugging purposes.

In some embodiments, the compiler 120 is configured to divide each high-level function/operator into a group of one or more tasks or sub-tasks, wherein each of the group of one or more tasks is compiled to a set of low-level instructions. For a non-limiting example, a task may correspond to 30 ISA instructions. The compiler 120 then assigns one of the one or more IDs to one or more of the group of tasks. In some embodiments, multiple tasks may share the same ID. For example, an ID may correspond to task #1 and #30. As there may be multiple reserved fields in the header of the set of low-level instructions, in some embodiments, the compiler 120 is configured to encode hierarchical information (e.g., operator type and call count) in the one or more reserved fields of the header associated with the set of low-level instructions in addition to the IDs. In some embodiments, the compiler 120 is configured to further include a line number in the high-level code as one of the IDs where the high-level function is being called in the high-level code for tracking and debugging of the high-level function. For a non-limiting example, the line number may be assigned in a field adjacent to the ID and they would occupy, e.g., 9 and 16 bits, in the field of the header, respectively, as shown by the example depicted in FIG. 2. In some embodiments, the actionable item (e.g., debugAction) allows a certain action to be taken when the set of low-level instructions are executed. For a non-limiting example, the certain action can be an action for performance profiling or code debugging purposes, which can be one of "no-action", "start or stop counter" of instructions being executed, "halt execution and dump registers or memory" to check the current content in the registers or memory.

In some embodiments, the compiler 120 is configured to generate additional information to further correlate the high-level function to one or more layers of a neural network used for machine learning applications. For non-limiting examples, the neural network can be but is not limited to one of a convolution neural network (CNN), a recurrent neural network (RNN), a gradient boosting machine (GBM), and a generative adversarial neural network. For non-limiting examples, the additional information includes but is not limited to which tasks of the high-level function belong to a specific neural network layer as well as which neural network layer the high-level function belongs to. As such, one or more IDs can be further mapped to one or more neural network layers of a given neural network. In some embodiments, the compiler 120 is configured to save the additional information in a separate debug output file.

Figure 3:
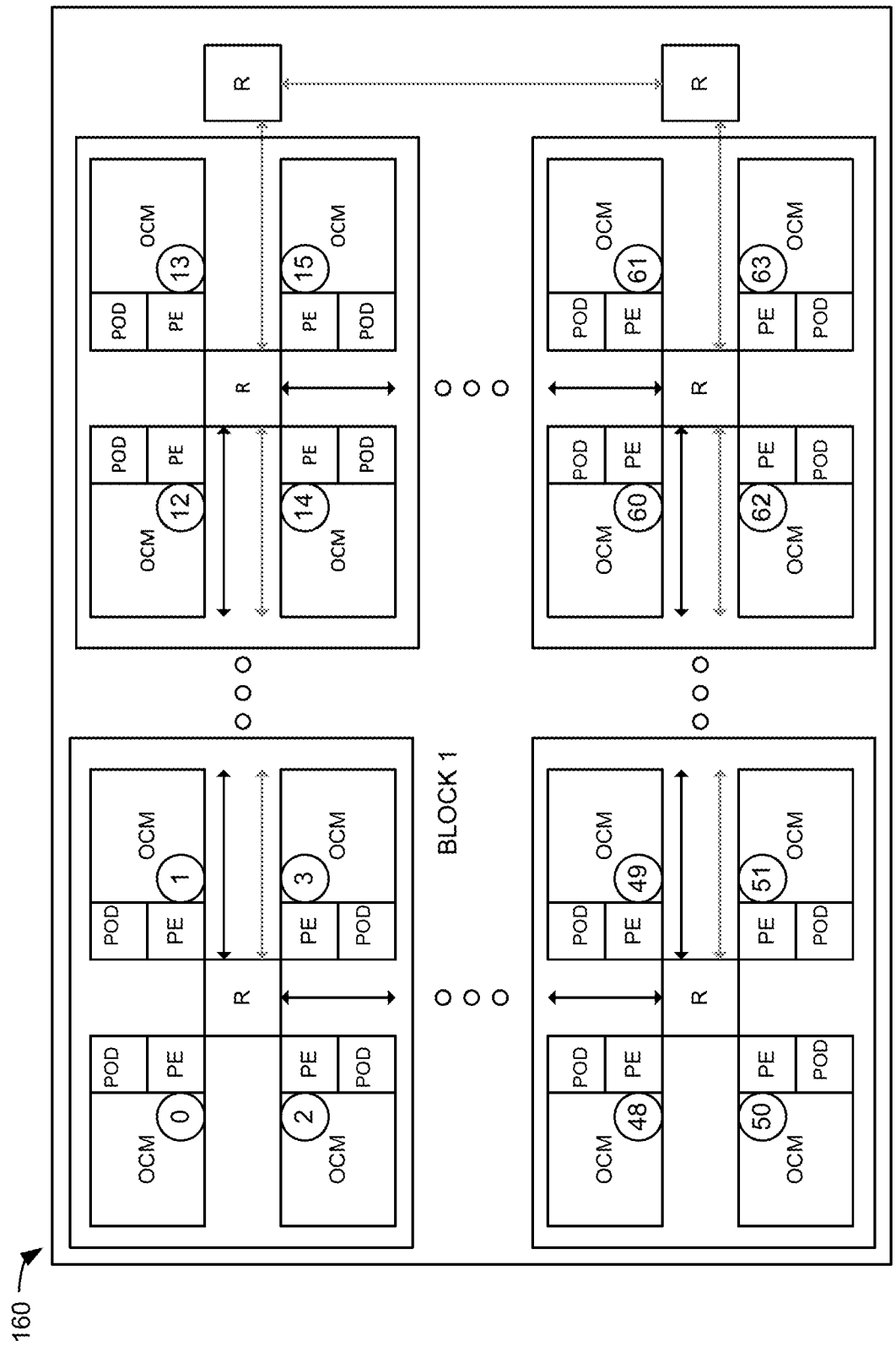
FIG. 3 depicts an example of an inference engine that includes a plurality of processing tiles arranged in a two-dimensional array of a plurality of rows and columns according to one aspect of the present embodiments.

Once the set of low-level instructions has been compiled from each high-level function and with the one or more IDs and the actionable item incorporated, the compiler 120 is configured to stream the set of low-level instructions as well as data received from the host for the application to the ML hardware 160 for execution. In the example of FIG. 1, the ML hardware 160 is a dedicated hardware block/component including one or more microprocessors and/or on-chip memory (OCM) units storing the data and/or the set of low-level instructions compiled from the high-level code performing one or more ML operations. For a non-limiting example, the ML hardware 160 can be but is not limited to an inference engine, which is configured to infer and identify a subject for the application via inference from trained data. At runtime, the ML hardware 160 is configured to retrieve the set of low-level instructions and/or data received from the compiler 120 and execute the set of low-level instructions to perform the high-level application/ML operation according to the set of low-level instructions. FIG. 3 depicts a non-limiting example of an inference engine 160 that includes a plurality of processing tiles, e.g., tiles 0, . . . , 63, arranged in a two-dimensional array of a plurality of rows and columns, e.g., 8 row by 8 columns. Each processing tile (e.g., tile 0) includes at least one on-chip memory (OCM), a first type of processing unit (POD), and a second type of processing unit (PE). Both types of processing units can execute and be programmed by some of the plurality of low-level instructions received from the compiler 120. In some embodiments, a plurality of processing tiles forms a processing block, e.g., tiles 0-3 forms processing block 1 and the processing tiles within each processing block are coupled to one another via a routing element, e.g., tiles 0-3 are coupled to one another via routing element R to form processing block 1.

Figure 4:
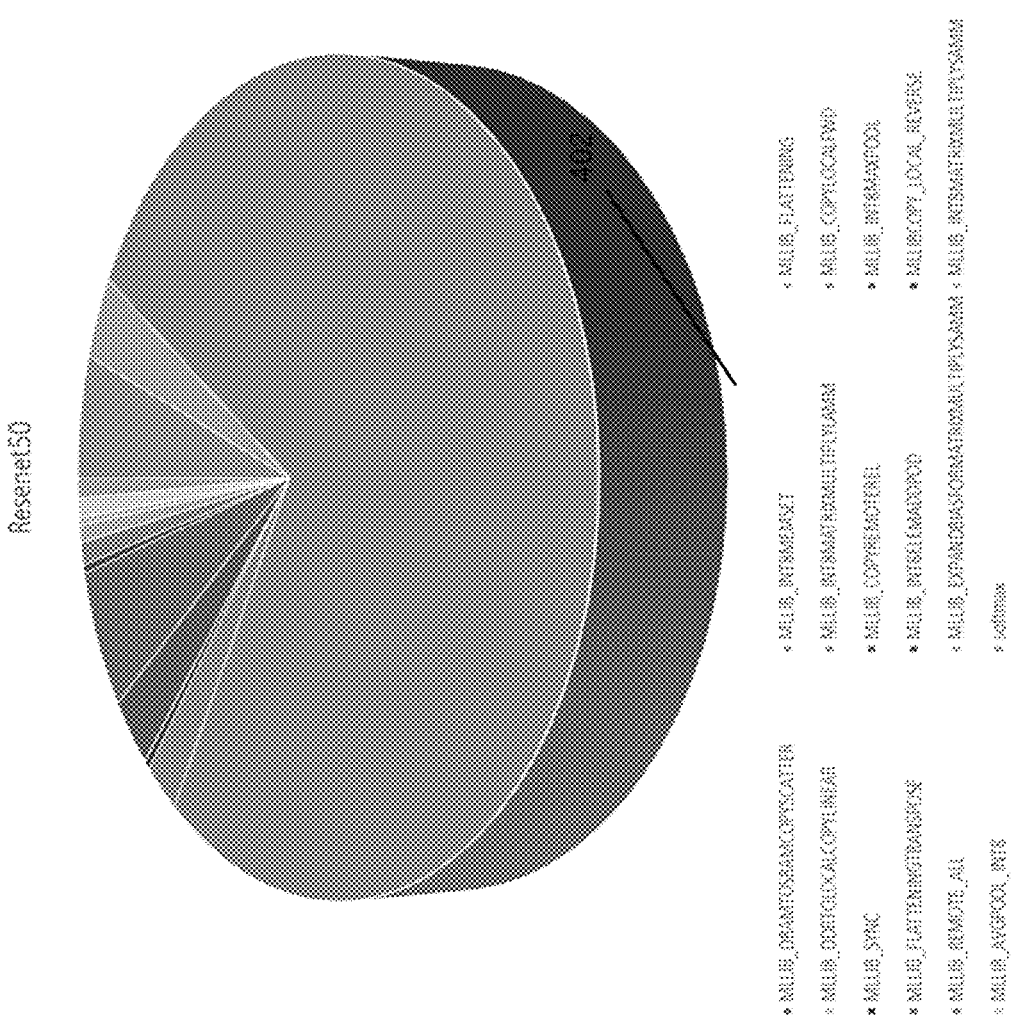
FIG. 4 depicts an example of a pie chart illustrating the time spent executing a plurality of high-level functions on the ML hardware according to one aspect of the present embodiments.

When the plurality of low-level instructions are retrieved from the memory and executed by the microprocessors of the ML hardware 160, the profiling and debugging engine 140 is configured to monitor and profile the performance and/or issues/problems/errors/bugs to debug the high-level function that has been mapped to the set of low-level instructions being executed. Based on the mapping between the high-level functions in the high-level code to their respective set of low-level instructions, in some embodiments, the profiling and debugging engine 140 is configured to monitor the performance of the plurality of high-level functions in the high-level code in terms of the time spent executing them as measured by the number of clock cycles of the ML hardware 160. In some embodiments, the profiling and debugging engine 140 is configured to generate an overall time-spent profile of an ML application (e.g., an inference run), wherein the profile demonstrates the time spent by the ML hardware 160 to execute the set of low-level instructions mapped to each of the plurality of high-level functions. FIG. 4 depicts an example of a pie chart illustrating the time spent executing a plurality of high-level functions on the ML hardware 160. As shown by the example of FIG. 4, the matrix multiplication function 402 takes the largest amount of time to execute among all of the high-level functions monitored. Such knowledge of the performance of high-level functions can be utilized by the compiler 120 to optimize the high-level code, especially those high-level functions that take the longest time to execute by, for a non-limiting example, reducing the number of low-level instructions or using a different set of low-level instructions corresponding to the longest running high-level functions to be executed on the ML hardware 160.

Figure 5B:
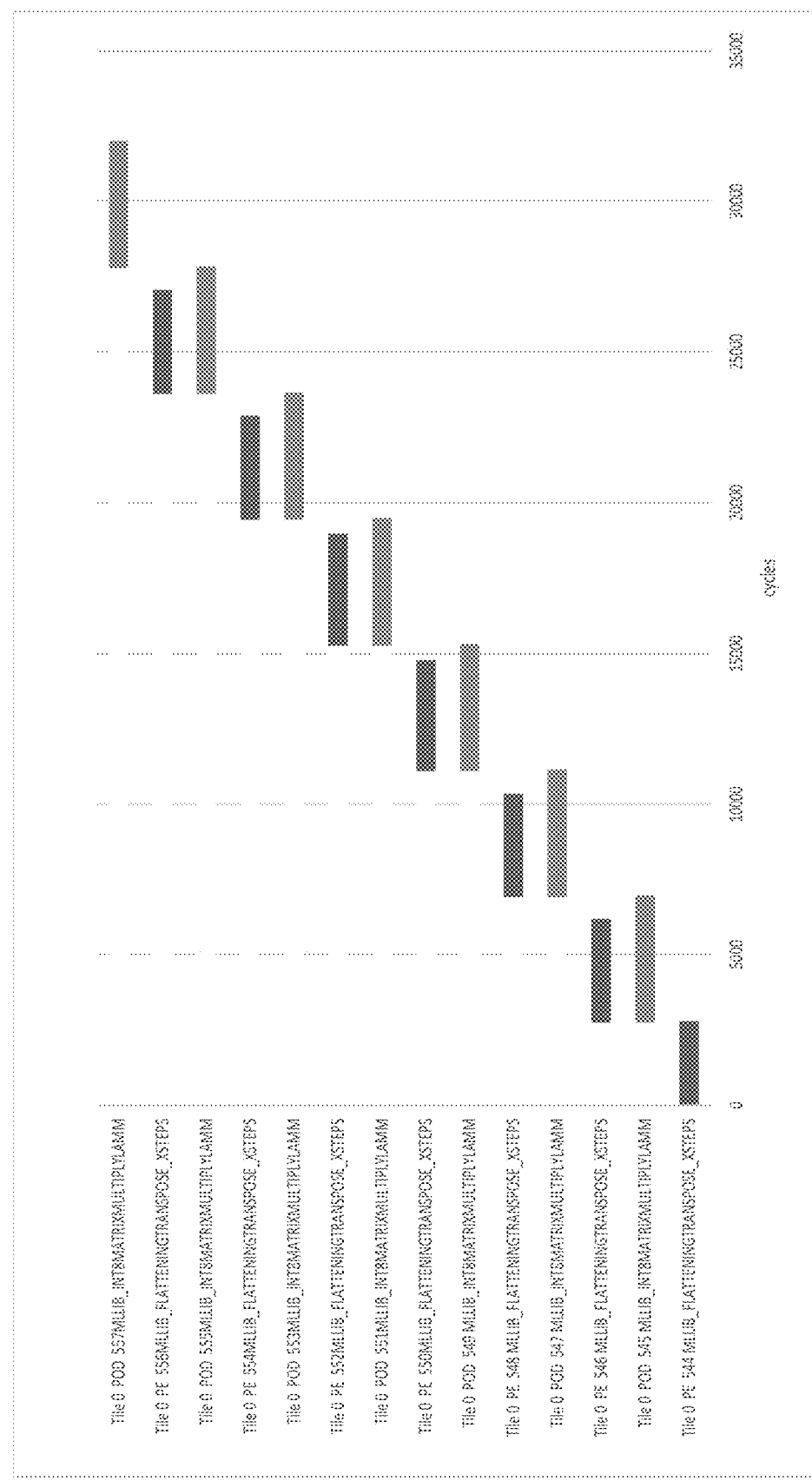

In some embodiments, the profiling and debugging engine 140 is configured to obtain the IDs and/or the line numbers of the high-level functions from the header of the set of low-level instructions mapped to each of the high-level functions. The profiling and debugging engine 140 may further obtain information about which components (e.g., processing tiles of an inference engine) of the ML hardware 160 are actively being used to execute the set of low-level instructions mapped to a high-level function. In some embodiments, the profiling and debugging engine 140 is configured to obtain this information from a file generated by the ML hardware 160 during execution of the low-level instructions. FIGS. 5A-5B depict an example of performance stats of two high-level functions measured in terms of clock cycles in table and bar chart formats, respectively. In the example of FIG. 5A, the table includes information on tile ID 502, task ID 504, agent ID 506, cycle start time 508, cycle end time 510, debug/function ID 512, line number 514, as well as start (e.g., 516, 520) and end (e.g., 518, 522) cycle times for different processing units, respectively. As shown by the example in FIGS. 5A-5B, the two high-level functions are denoted by the IDs MLLIB_FLATTEN-INGTRANSPOSE_XSTEPS and MLLIB_INT8MATRIXMULTIPLYLAMM and are called at line 2411 and 2415 of the high-level code, respectively. These two high-level functions are executed on two different types of processing unit POD and PE of tile 0 of the example of the inference engine shown in FIG. 3, respectively, wherein each of the two high-level functions comprises 7 tasks each having one or more low-level instructions.

Figure 6:
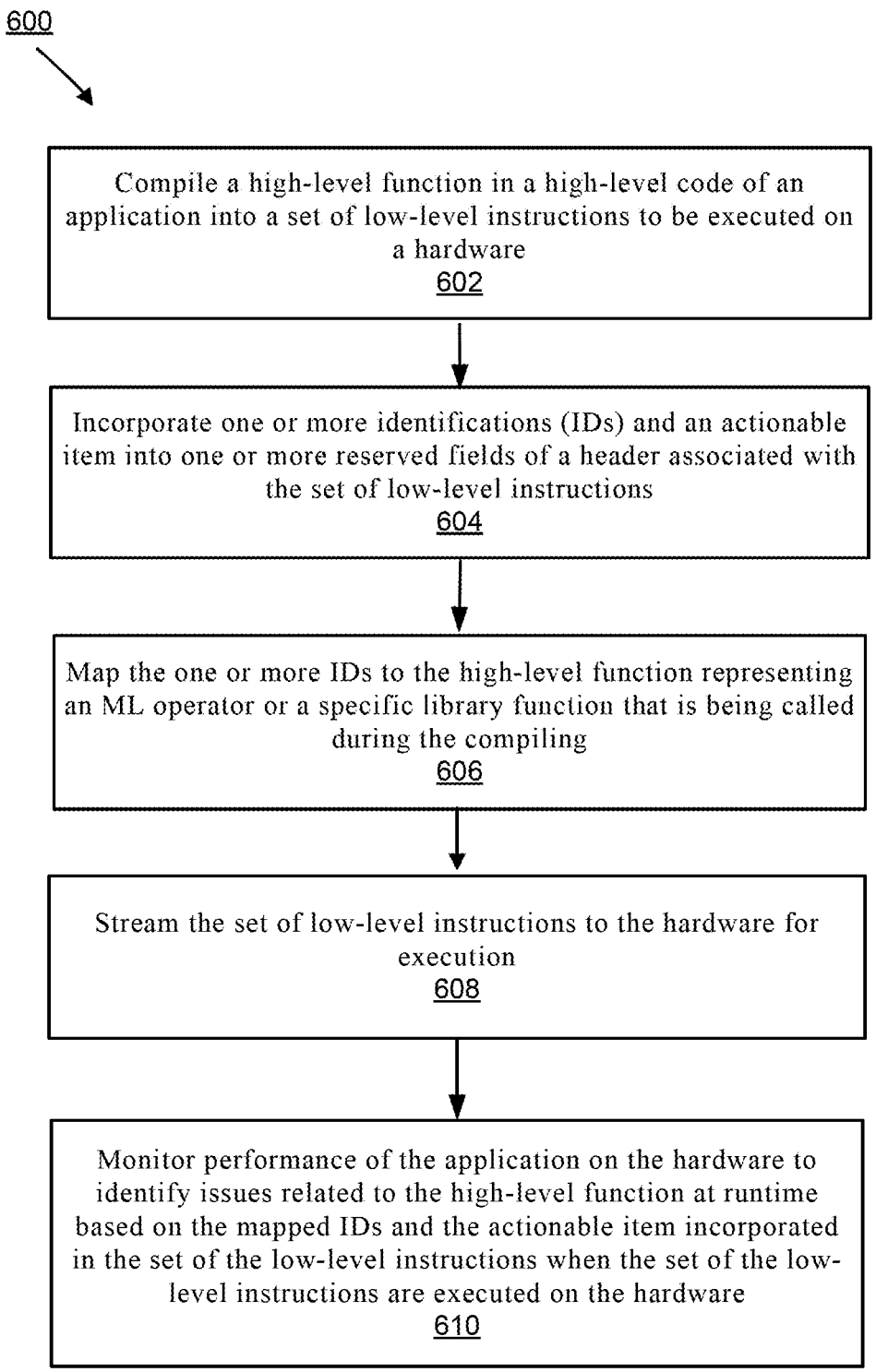
FIG. 6 depicts a flowchart of an example of a process to support correlating high-level code with low-level instructions of an application running on ML hardware according to an aspect of the present embodiments.

FIG. 6 depicts a flowchart 600 of an example of a process to support correlating high-level code with low-level instructions of an application running on ML hardware. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 6, the flowchart 600 starts at block 602, where a high-level function in a high-level code of an application is compiled into a set of low-level instructions to be executed on a hardware. The flowchart 600 continues to block 604, where one or more identifications (IDs) and an actionable item are incorporated into one or more reserved fields of a header associated with the set of low-level instructions. The flowchart 600 continues to block 606, where the one or more IDs are mapped to the high-level function representing an ML operator or a specific library function that is being called during the compiling. The flowchart 600 continues to block 608, where the set of low-level instructions is streamed to the hardware for execution. The flowchart 600 ends at block 610, where performance of the application on the hardware is monitored to identify issues related to the high-level function at runtime based on the mapped IDs and the actionable item incorporated in the set of the low-level instructions when the set of the low-level instructions are executed on the hardware.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. A computer-implemented system, comprising:
a memory for storing instructions; and
a processor configured to execute the instructions for implementing a compiler configured to:
receive a high-level code of an application comprising one or more high-level functions;
compile the one or more high-level functions in the high-level code of the application into a set of low-level instructions to be executed on a hardware, wherein one or more identifications (IDs) are generated during compiling,
wherein compiling further includes:
assign one of the one or more IDs to the set of low-level instructions;
map each high-level function of the one or more high-level functions to an ID of the one or more IDs, wherein the each high-level function is associated with a machine learning (ML) operator or a specific library function that is being called by the compiler; and
incorporate the one or more IDs and an actionable item of one or more actionable items associated with the each high-level function into one or more reserved fields of a header of the set of low-level instructions, wherein the one or more IDs and the one or more action items are configured to profile performance of the high-level code; and
stream the set of low-level instructions to the hardware for execution.

2. The system of claim 1, further comprising:
a profiling and debugging engine configured to
monitor performance of the application on the hardware to identify issues related to the one or more high-level functions at runtime based on the one or more mapped IDs and the one or more actionable items incorporated in the set of the low-level instructions being executed.

3. The system of claim 1, wherein:
the high-level code of the application includes one or more library function calls.

4. The system of claim 1, wherein:
the set of low-level instructions is configured to program one or more of: one or more input data streams to the hardware, one or more operations to be performed on the input data streams, and one or more output data streams from the ML hardware when being executed.

5. The system of claim 1, wherein:
a certain action is taken according to each of the one or more actionable items when the set of low-level instructions are executed.

6. The system of claim 1, wherein:
the hardware is a dedicated hardware block including one or more microprocessors and on-chip memory (OCM) units storing data and/or the set of low-level instructions compiled from the one or more high-level functions.

7. The system of claim 1, wherein:
the compiler is configured to dynamically adjust the mapping between the one or more IDs and the one or more high-levelfunctions at runtime.

8. The system of claim 1, wherein:
the compiler is configured to divide the one or more high-level functions into one or more groups of one or more tasks, wherein one task of the one or more groups of one or more tasks is compiled to a set of low-level instructions.

9. The system of claim 8, wherein:
the compiler is configured to assign one of the one or more IDs to the one task of the one or more groups of one or more tasks, wherein more than one task share the same ID.

10. The system of claim 1, wherein:
the compiler is configured to encode hierarchical information in the one or more reserved fields of the header associated with the set of low-level instructions in addition to the one or more IDs.

11. The system of claim 1, wherein:
the compiler is configured to include a line number where one of the one or more high-level functions is being called in the high-level code in the one or more reserved fields for tracking and debugging of the one of the one or functions.

12. The system of claim 1, wherein:
the compiler is configured to generate additional information to correlate the one or more high-level functions to one or more layers of a neural network.

13. The system of claim 1, further comprising
a profiling and debugging engine configured to monitor performance of a plurality of the high-level functions in the high-level code in terms of the time spent executing the plurality of the high-level functions based on the mapping between the high-level functions to their respective set of low-level instructions.

14. The system of claim 13, wherein:
the profiling and debugging engine is configured to generate an overall time-spent profile of the application, wherein the profile demonstrates the time spent by the hardware to execute the set of low-level instructions mapped to each of the plurality of the high-level functions.

15. The system of claim 13, wherein
the profiling and debugging engine is configured to obtain information associated with a component of the hardware being used to execute the plurality of the high-level functions.

16. A computer-implemented method, comprising:
receiving a high-level code of an application comprising one or more high-level functions;
compiling the one or more high-level functions in the high-level code of the application into a set of low-level instructions to be executed on a hardware, wherein one or more identifications (IDs) are generated during compiling,
wherein the compiling further includes:
assigning one of the one or more IDs to the set of low-level instructions;
mapping each high-level function of the one or more high-level functions to an ID of the one or more IDs, wherein the each high-level function is associated with a machine learning (ML) operator or a specific library function that is being called during the compiling; and
incorporating the one or more IDs and an actionable item of one or more actionable items associated with the each high-level function into one or more reserved fields of a header of the set of low-level instructions, wherein the one or more IDs and the one or more action items are configured to debug the high-level code; and
streaming the set of low-level instructions to the hardware for execution.

17. The method of claim 16, further comprising:
monitoring performance of the application on the hardware to identify issues related to the one or more high-level functions at runtime based on the one or more mapped IDs and the one or more actionable items incorporated in the set of the low-level instructions being executed.

18. The method of claim 16, further comprising:
programming one or more of: one or more input data streams to the ML hardware, one or more operations to be performed on the input data streams, and one or more output data streams from the ML hardware when the set of low-level instructions are being executed.

19. The method of claim 16, further comprising:
taking a certain action according to each of the one or more actionable items when the set of low-level instructions are executed.

20. The method of claim 16, further comprising:
dynamically adjusting the mapping between the one or more IDs and the one or more high-level functions at runtime.

21. The method of claim 16, further comprising:
dividing the one or more high-level functions into one or more groups of one or more tasks, wherein one task of the one or more groups of one or more tasks is compiled to a set of low-level instructions.

22. The method of claim 21, further comprising:
assigning one of the one or more IDs to the one task of the one or more groups of one or more tasks, wherein more than one task share the same ID.

23. The method of claim 16, further comprising:
encoding hierarchical information in the one or more reserved fields of the header associated with the set of low-level instructions in addition to the one or more IDs.

24. The method of claim 16, further comprising:
including a line number where one of the one or more high-level functions is being called in the high-level code in the one or more reserved fields for tracking and debugging of the one of the one or more high-level functions.

25. The method of claim 16, further comprising:
generating additional information to correlate the one or more high-level functions to one or more layers of a neural network.

26. The method of claim 16, further comprising:
monitoring performance of a plurality of the high-level functions in the high-level code in terms of the time spent executing the plurality of the high-level functions based on the mapping between the high-level functions to their respective set of low-level instructions.

27. The method of claim 26, further comprising:
generating an overall time-spent profile of the application, wherein the profile demonstrates the time spent by the hardware to execute the set of low-level instructions mapped to each of the plurality of the high-level functions.

28. The method of claim 26, further comprising:
obtaining information about associated with a component of the hardware being used to execute the plurality of the high-level functions.

29. A system, comprising:
a means for receiving a high-level code of an application comprising one or more high-level functions;
a means for compiling the one or more high-level functions in the high-level code of the application into a set of low-level instructions to be executed on a hardware, wherein one or more identifications (IDs) are generated during compiling and wherein the one or more IDs are not executable;
wherein compiling further includes:
assigning one of the one or more IDs to the set of low-level instructions;
mapping each high-level function of the one or more high-level functions to an ID of one or more IDs to the high-level, wherein the each high-level function is associated with a machine learning (ML) operator or a specific library function that is being called during the compiling; and incorporating the one or more IDs and an actionable item of one or more actionable items associated with the each high-level function into one or more reserved fields of a header of the set of low-level instructions, wherein the one or more IDs and the one or more action items are configured to profile performance of the high-level code and debug the high-level code; and a means for streaming the set of low-level instructions to the hardware for execution.

* * * * *